Patented Feb. 16, 1937

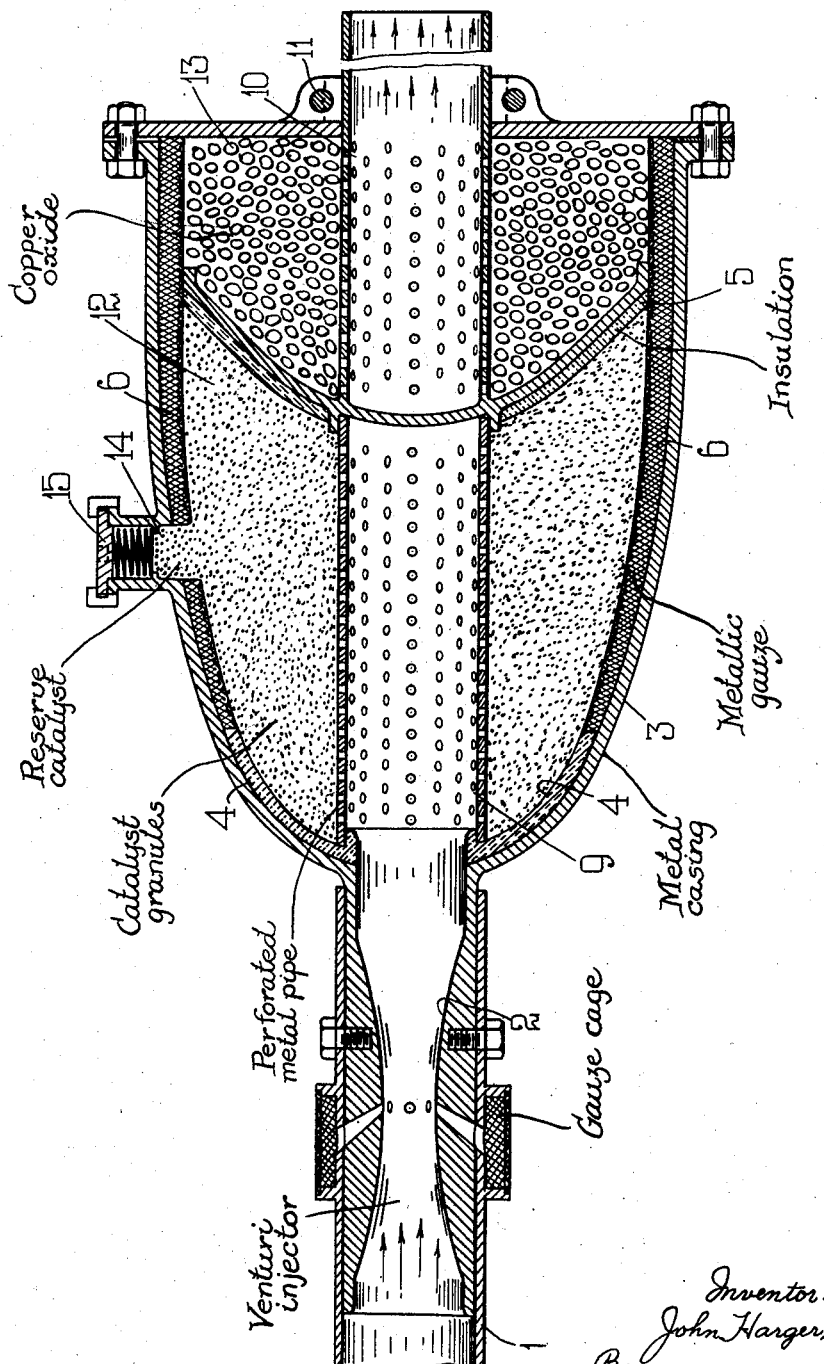

2,071,119

UNITED STATES PATENT OFFICE 2,071,119

PROCESS AND APPARATUS FOR TREATING FURNACE GASES AND EXHAUST GASES FROM INTERNAL COMBUSTION ENGINES

John Harger, Liverpool, England

Application May 12, 1933, Serial No. 670,809
In Great Britain May 12, 1932

2 Claims. (Cl. 23—2)

This invention relates to improvements in the process for treating the exhaust gases from internal combustion engines, for example of the spark ignition type or of the compression ignition type, and in the apparatus therefor, to effect combustion of carbon monoxide and/or other obnoxious gases or material.

One of the objects of this invention is to provide an improved process and apparatus which is believed to offer the first practical solution of the difficulty of effecting satisfactory combustion under the widely varying conditions (speed and volume, temperature and composition of gases) prevailing in the exhaust of an automobile. Further objects are to provide apparatus having improved means for supply of secondary air; to eliminate the necessity of preheating the apparatus except by the heat of the gases, if desired; to provide novel catalysts and catalyst carriers; to produce novel assemblies of selected and graded catalysts; to provide chemical means for supplying oxygen for combustion; to construct novel silencers; and generally, as defined in the appended claims.

It has been proposed to effect the combustion of carbon monoxide and unburnt or partly burnt gasoline or other fuel by passing the mixture over catalysts in variously designed containers with or without mixing the exhaust gas with a supply of air.

The catalysts hitherto proposed for this purpose are many and varied such as platinum and nickel on grids of platinum or other heat resisting metal; oxides of copper, nickel, cobalt, iron, chromium, manganese, vanadium, etc.; metallic palladium spread over asbestos, or pumice, or over nickel gauze; manganites of the heavy metals, the earth metals, the rare earth metals or mixtures of these; manganites of iron, nickel, cobalt, copper, zinc, cadmium; mixtures of copper manganite with oxide of cobalt, iron oxide or with metals such as iron, zinc or aluminium; metallic chromites and artificially prepared iron chromite applied to metallic grids or gauzes and numerous other catalysts.

I have found that the apparatus hitherto proposed does not give satisfactory results under the extremely exacting conditions prevailing in the operation of an automobile. In one proposal it was suggested to preheat the gases to 450° C. and it was stated that the temperature of the catalyst rose to 1100° C. Such preheating is expensive, and the catalysts hitherto suggested fail to withstand such high temperatures. The problem has hitherto been unsolved in practice either because the catalysts failed to exert the necessary sensitiveness to start up from cold, the necessary flexibility to act under widely varying conditions, or the necessary robustness to resist high temperatures such as are found to occur when large volumes of gas are subjected to the combustion reaction.

I have found by many hundreds of experiments that the essential condition of success is that a reaction-zone, which I term a zone of intense and persistent chemical activity, must be developed in the purifier. This is absolutely essential for the successful treatment of exhaust gas. It must form quickly and persist under very varying quantities of gas of varying compositions being passed through the purifier, from the amount passed at idling speed in a traffic hold-up to full speed of the engine when a low gear is engaged under full load. The zone is characterized by the property that no unburnt gas when accompanied by the oxygen necessary, preferably in slight excess, for its combustion can pass through it without the whole, or substantially the whole, of it being burnt. In this active zone I believe there is a discharge of an enormous stream of electrons from the granular catalysts as in the process which has been termed catalytic, flameless or surface combustion.

In any of the forms of my invention for the combustion of unburnt products in the exhaust gas of automobile engines it consists in each case of the purifier with its fittings being so designed and constructed and the catalysts so chosen, graded and arranged, that when the hot exhaust gas, mixed with air, when necessary, in the manner to be described later, is passed through, a zone of intense and persistent chemical activity, much hotter than the entering gases, is formed in the catalyst mass and the burnable products are burnt. This zone persists so long as the engine continues to run, under any differences of quality or quantity of gas passed. It remains hot for a long time after the engine has stopped and starts to function again almost at once on re-starting the engine, while, from everything cold, it starts to function in two to three minutes. Moreover, these operations can be repeated over and over again throughout long periods without either the apparatus or the catalysts losing their efficiency.

In one form of my invention the air is introduced in two stages. By this arrangement an excessive amount of combustion can be avoided in one zone but in this modification there are or may be two zones and other complications and the only advantage is that, if the apparatus is suitably designed, it is not absolutely necessary to use highly refractory catalysts or catalysts with a highly refractory support.

The preferred form of the invention is illustrated in the accompanying drawing which is a diagrammatic cross-section of the purifier and the air-inlet device.

In my invention I have devised a much simpler method of introducing the air, when required, than has been proposed up to now. I find it is not necessary to use a blower, which is expensive and a trouble and expense to keep in order, or even a complicated jet injector which are the two forms which have hitherto been proposed for this service. I prefer to employ a properly designed venturi contraction apparatus, shaped in the well known way with suitably designed holes pierced in the venturi at or just beyond the narrowest part of the throat; this is introduced into the exhaust pipe, which is suitably proportioned to the volume of the gas to be passed. This arrangement is quite satisfactory in practice and preferable in every way to the means hitherto proposed.

For a 10 H. P. (British Treasury rating) automobile motor, I find a venturi with a ½ inch diameter throat and with 8 holes each 1/16 inch diameter to be satisfactory. The holes are covered with a small cage of fine mesh gauze to prevent blockage by dirt picked up from the road, etc.

This apparatus is placed immediately before the purifier, i. e. the vessel containing the catalyst or catalysts.

The purifier is an apparatus which is attached to the exhaust gas pipe in the position usually occupied by the silencer, which it replaces. It is a better silencer than an ordinary one, although less in size by about one half.

The purifier may be made of any suitable material such as mild steel plate, or thin cast iron, or ordinary or heat-resisting austenitic cast iron but for lightness as well as heat-resisting properties, aluminium-treated mild steel is preferable.

The purifier can be made in any convenient form with fittings of perforated metal or gauze, again preferably made of aluminium-coated iron, such that the exhaust gases meet a large cross-sectional area of catalyst, preferably in granular form, and it is preferably designed so as to give an increasing cross-sectional area as the gases pass through the first part of the purifier, where the combustion takes place in the zone of intense chemical reaction, to the position where the catalyst granules adjoin a baffle such as a barrier of perforated fire clay or perforated iron, or metal gauze.

In any form of the purifier sharp corners where pockets of catalyst would remain out of the main stream of gas, are avoided as much as possible.

Certain parts of the apparatus are heat-insulated from the main walls of the purifier such as the perforated barrier pipe (connected with inlet pipe I) at which the gases enter the catalyst mass and the baffle plate shown in the drawing is covered with heat-insulating material or it is made of some non-conductor.

In any form of the purifier it is desirable to provide a storage hopper which is filled with a reserve supply of catalyst with mechanical means for automatically forcing it down into the main body of the catalyst mass so as to insure that the vessel is always full, and thus avoid undue powdering of the catalyst due to relative movement of the granules. In large purifiers there may be two or more of such storage hoppers.

The purifier attached to an automobile engine is called upon to treat the gas at very varying speeds of flow. There is enormously more gas passed at full speed than when idling, but I have found in practice that, with a properly designed venturi for the size of the engine, sufficient air is sucked in at all speeds of the engine to burn the carbon monoxide and excess of gasoline used. It is true that at idling speed there is very little air sucked in but I have found with a properly adjusted carburettor there is sufficient oxygen in the gases to burn the carbon monoxide when they are passed through the purifier.

In one form of my invention, after the gases have passed through the part of the purifier where the combustion is effected in the zone of intense chemical activity, the gases are cooled somewhat by being brought into contact with the bare outer walls of the purifier, they are then passed through what I call a finishing zone in which they meet granules of copper oxide or preferably of refractory material containing copper oxide and then out into the atmosphere. This finishing zone is especially useful in supplying oxygen when the gases are temporarily short of oxygen to finish the combustion; for example, when gushes of semi-burnt lubricating oil enter the exhaust gas, the copper oxide is reduced to copper and subsequently re-oxidized when the gases become normal with an excess of oxygen.

By the use of highly reactive refractory catalysts, which will presently be described, I have found that it is unnecessary to preheat the air sucked in by the Venturi injector, for although from the point of initial starting up there might be a few seconds gained by preheating, this is more than offset later by the disadvantage of accumulating excessive heat in the purifier, which is not required. I therefore prefer not to preheat the air.

In any form of my invention it is essential in the region of the zone of intense chemical reaction that conduction and radiation therefrom must be under control and generally speaking, as little heat as possible should be lost from that zone by radiation and conduction until after the combustion is complete. Wherever the zone of intense chemical reaction starts or is started it will work back on to the layers of catalyst where the exhaust gas and air enters the catalyst mass. The barrier there must be capable of withstanding the action of the gases at a red heat or higher temperature. It is therefore made of perforated fire clay or of suitable perforated metal or gauze, and part of the combustion reaction will take place on such barrier. I have found that gauzes of metals such as nickel, Monel metal or Staybrite stainless steel are effective in bringing about the combustion of the products but that in use they become brittle and crumble away.

As the result of many experiments I prefer to use iron gauze made from comparatively thick gauge wire. This is heated to remove the products put on the wire during its manufacture then sand-blasted and thoroughly cleaned and finally sprayed with molten aluminium and heated in a reducing atmosphere to redness to cause the aluminium to alloy with the iron and form a homogeneous covering over it.

The catalyst is preferably surrounded by perforated fireclay or of suitable metal such as perforated and corrugated aluminium-covered iron or of the aluminium-covered gauze the making of which has just been described. When gauze alone is used it is preferably arranged in one form of purifier in sections, portions of each section being bent over to keep the rest of the gauze somewhat away from the walls of the purifier and so form clear passages for the gases through the purifier.

The gas passes longitudinally through the first part of the central perforated pipe 9, radially outward through the annular body of catalyst, along the space between the wall 3 and the catalyst (which is not entirely filled by gauze 6) and then when it has passed the central partition (shown covered by insulation 5) the gases pass through the gauze and radially inwards through the catalyst to be discharged through the perforated central pipe which ends in outlet pipe 10. Thus the flow of gas is reversed by the central baffle but owing to the radial flow there is very little back pressure, since the gauze does not interpose much resistance.

The accompanying drawing shows one suitable form of apparatus embodying preferred conditions. In this drawing, 1 is the inlet pipe, 2 the Venturi pipe, and 3 the body of the purifier. 4 and 5 is the insulation. 6 is the metallic gauze. 9 is the perforated distributor pipe and 10 the outlet pipe of which the part outside the purifier is secured by set screws 11. The catalyst granules are shown at 12 while 13 represents the copper oxide. 14 is the hopper for reserve catalyst with a spring cap 15.

In one form of my invention the space for the catalyst mass is filled with granular catalyst more or less uniform in composition and in this case it is preferably all in the form of a highly refractory catalyst which is highly reactive at about 200° C. as hereafter described, though I may also use an ordinary highly refractory catalyst which is highly reactive at about 350° C. in conjunction with one of the means for starting it up as hereafter described. In any of these modifications, an exhaust gas temperature of 200° C. is sufficient.

In another form of my invention I employ several zones of granular catalysts of different relative activity in the exhaust gas purifier, the difference being due to different chemical composition of the catalysts and/or to a difference in size of the granules.

The first zone which the gases meet is the least reactive and may be composed of relatively coarse granules of very highly refractory material such as silica, alumina, fritted bauxite, unglazed porcelain, fire-brick of high melting point or the like, characterized by being highly reactive at an initial temperature of 600° C. or thereabouts. The second zone may be composed of granules of highly refractory catalysts which are highly reactive at initial temperature of 350° C. or thereabouts. The third zone is composed of granules of highly refractory catalyst which is highly reactive at an initial temperature of 200° C. or thereabouts or less.

These zones may be separated by the aluminium-covered iron gauze or they may have nothing to divide them and no sharp division between them.

In practice, using this form of packing in the purifier, the reaction first starts in the most active part of the catalyst and so soon as this zone is well heated up the action spreads back, against the current of the gases, into the part active at an initial temperature of 350° or thereabouts and finally back into the comparatively inert first zone and remains there so long as the temperature and the combustion of the contents of the incoming gas can maintain it at a bright red heat.

After passing through the last mentioned zone the gases may be cooled somewhat by bringing them in contact with the walls of the exhaust gas purifier or into contact with metal plates connected with the walls and they may then be passed through a finishing zone already described.

In one form of my invention I employ mixtures of granular catalysts of different chemical composition, each kind having a melting point well above the maximum temperature reached in the combustion reactions, so chosen that when strongly heated they adhere, e. g. by local chemical reaction between them at the points of contact of the dissimilar granules, and the whole mass becomes fritted together into a highly porous mass. This fritting may be effected either before placing in the exhaust gas purifier or in situ.

As regards suitable catalysts I find that natural bauxite, other natural minerals rich in aluminium hydrate and other natural compounds of aluminium, also artificially prepared alumina and aluminates such for example aluminates of magnesium, copper, manganese, iron alone or mixed are suitable catalysts and/or catalyst supports. In addition to these I find alumina and/or certain refractory products rich in alumina, and/or magnesia or salts of magnesium, mixed with cement and moulded into any required shape are suitable catalysts and/or catalyst supports. In addition to these, alumina compounds rich in aluminium, magnesia and magnesium compounds mixed with clay and moulded and baked are suitable catalysts and/or catalyst supports.

Any of these before-mentioned materials or preparations, except bauxite and other materials very rich in alumina, may be made into more efficient catalyst supports by the addition of alumina with or without other materials, compounds of certain elements such as copper, manganese, iron, magnesium, titanium and the like and this may be done in one or more of several ways, for example:—

(a) By soaking into the catalyst support preparation a solution of a salt of aluminium and igniting.

(b) By soaking into the preparations a solution of a salt of aluminium, drying and then soaking in a solution of sodium or other soluble aluminate.

(c) By soaking into the preparations a solution of mixed salts of aluminium, magnesium, iron, titanium, copper and/or manganese, followed, after drying, by ignition, or by soaking the product in a solution of sodium or of other soluble aluminates.

In any of these processes of enriching the catalyst supports with alumina and the like the preparations resulting should be washed free from any salts of the alkali metals such as chlorides, sulphates, carbonates or hydrates otherwise the finished product in use will exhibit incipient melting and become less active.

Any of these catalysts or catalyst supports can be made more active, or active at a lower temperature, for use in burning the combustible products by the addition of other suitable compounds.

Pure alumina is comparatively inert as a catalyst in these reactions below about 500° C., even when in a very porous condition, and some varieties of bauxite rich in silica or compounds of silicon do not become very active below a temperature of 500° C. whilst other varieties of bauxite containing only a small quantity of silica or silicon compounds but containing some iron and titanium compounds become very active at about 350° C. The suitable compounds which I have found to add to any of the refractory catalysts mentioned in order to activate them are chromic acid, (10% solution in water); chromic oxide $Cr_2O_3$; (put on as 10% aqueous solution of ammonium bichromate); bichromate of aluminium, iron and/or copper (10% aqueous solution) potassium permanganate (6% aqueous solution) alone or with copper salts (20% aqueous solution) or with copper and manganese salt; copper sulphate alone or mixed with one fifth the quantity of manganese sulphate; ferrous sulphate; copper chloride, copper and titanium chloride, copper sulphate and one fifth the quantity of manganese chloride.

By way of example, a sufficient quantity of the suitable bauxite is ignited at 500 C. or thereabouts ground and graded through a sieve 4 meshes to the inch and retained on sieve 10 meshes to the inch. The analysis of this ignited bauxite, which was found to be more active than most bauxites was

| | Percent |
|---|---|
| $Al_2O_3$ | 78 |
| $Fe_2O_3$ | 7 |
| $TiO_2$ | 13 |
| $SiO_2$ | 2 |
| | 100 |

The granules are soaked in an aqueous solution containing 20% copper sulphate crystals $CuSO_4 5H_2O$, 4% manganese chloride crystals, $MnCl_2 4H_2O$, any excess of liquid is drained off and the mass of granules dried and ignited at a dull red heat. It is then ready for use, without washing, in the purifier.

I have found specially active catalysts, which are active below 200° C. to be made in each case from suitable bauxite by treating it with dilute 7% solution of crystals of copper chloride; or copper acetate solution (saturated aqueous solution) followed after drying by potassium permanganate (6% aqueous solution); copper lactate solution followed after drying by potassium permanganate solution, aqueous solution of 20% copper sulphate and 4% manganese chloride with 5% sugar or other suitable organic compound followed after drying by potassium permanganate solution, ignition and careful washing with water; manganese nitrate crystals $Mn(NO_3)_2 6H_2O$ (20%) and chromic acid ignited and followed by copper bichromate (20% solution) mixed with a trace of silver bichromate.

By way of example:—A sufficient quantity of the suitable bauxite, the analysis of which has been given above, after being ignited and graded as described is soaked in an aqueous solution containing

| | Per cent |
|---|---|
| Copper sulphate crystals $CuSO_4 5H_2O$ | 20 |
| Manganese chloride crystals $MnCl_2 4H_2O$ | 4 |
| Sugar | 5 |

The excess of liquid is drained off and the granules dried; the dried material is then soaked in a 6% aqueous solution of potassium permanganate, the excess of solution drained off, the mass dried and ignited at a dull red heat. They are then washed in a stream of water dried and ignited. They are then ready for use in the purifier.

I have found still more active catalysts, which are active at or below 160° C., to be made in each case from suitable bauxite by treating it with potassium permanganate (6% solution) and igniting, followed by the addition of a 20% solution of copper chloride and one-fifth the quantity of manganese chloride; by treating it with a strong solution of 20% copper nitrate crystals $Cu(NO_3)_2 6H_2O$ and 4% manganese nitrate and igniting the product.

I give these by way of examples only, and similar products can obviously be made by activating the refractory catalysts other than bauxite.

Bauxite and the other refractory catalyst supports, previously mentioned but more especially the bauxite, are very crumbly and this is not rectified by any of the additions mentioned. I have found that bauxite or any of the other refractory catalyst supports can be made sufficiently robust for the use to which they are put in my invention by soaking them in very dilute solution of sodium or other soluble silicate, drying, soaking and drying again repeating these two operations as many times as may be necessary and finally igniting the product at a dull red heat.

By way of example:—a sufficient quantity of the suitable ignited bauxite, the analysis of which has been given, graded through 4 and on 10 mesh sieves is soaked in 5% aqueous solution of sodium silicate, any excess of solution is carefully removed by draining or by a centrifuge machine, the granules are dried and ignited at a dull red heat in a muffle furnace. They are allowed to cool and without delay soaked in an aqueous solution containing by weight 20% copper nitrate crystals $Cu(NO_3)_2 6H_2O$ 4% manganese nitrate crystals $Mn(NO_3)_2 6H_2O$, drained, dried and ignited at a dull red heat, then washed in a stream of water, dried and ignited. It is then ready for use in the purifier.

A similar result may be obtained by soaking the catalyst support material in a solution of a salt of one of the alkali metals and igniting at a dull red heat. Following this treatment the catalyst support may be treated with a solution of sodium aluminate, dried and well washed with water and activated, if required, by the addition of any of the activating substances previously mentioned or they may be activated previous to washing.

In experiments on the large scale on an automobile engine under the varied conditions met with there I have found that granules suitable for use in my invention are pieces preferably somewhat rounded in form which will pass readily through a sieve having 4 meshes to the linear inch and retained on a sieve having 10 meshes to the linear inch; finer granules or coarser ones can be used and I am merely stating the preferred size. Very fine granules cause too much back pressure and too coarse granules allow part of the burnable gases to pass unburnt.

Of the above preferred grading, through 4 and on 10, I may divide it again into two fractions (1) through 4 and on 8 (2) through 8 and on 10, placing the coarser fraction near the inner perforated barrier and the finer one near the outer perforated barrier.

I have found that various metal turnings, borings, shavings and the like-shaped pieces of metal act as satisfactory catalysts. These products may consist of ordinary cast iron, of ordinary steels, of alloys of iron copper and nickel, of iron copper and chromium and of other alloys of iron. These pieces of suitable metal in practice adhere together either alone, or preferably mixed with other granular catalysts before mentioned, to bind the whole mass together in a porous and sponge-like mass, which allows the gases to pass without exerting undue back pressure.

In one form of my invention I may use small quantities of highly reactive catalysts placed in one or more spots in the bulk of the catalyst mass. These consist of material either too expensive to use in bulk or of material the durability of whose activity is not so great as that of the bulk. The function of these highly reactive catalysts is to start the combustion process at a lower initial temperature than the bulk catalyst would do by itself.

In another form of my invention I may use a device for automatically forming a quantity of very fine active catalytic dust which is by any suitable means and when desired allowed to enter the stream of exhaust gas and air before or at the position where the gases meet the catalyst in the exhaust gas purifier causing it to react at a lower initial temperature.

In another form of my invention I may employ one or more tiny electric heaters situated in the mass of the catalyst at any convenient spot, such tiny heater or heaters being supplied with the necessary electric current from a storage battery or other source.

It has been indicated that the size of the purifier is one of the vital factors in the successful carrying out of my invention together with the other factors already discussed.

It is to a certain extent the most vital. It has happened in my experience that with an active catalyst and too small a purifier with too small a cross-sectional area that the fittings of iron were melted and if the process had not been stopped, by the blocking of the apparatus as a consequence, the outer iron walls of the purifier would undoubtedly have melted also.

The gases from a 40 H. P. (British Treasury rating) engine at full speed and normal working, would probably melt the fittings in one of my purifiers designed for a maximum of 20 H. P.

A cubic capacity of about 65 cubic inches of catalyst mass has been found to work best with a 12½ H. P. engine. Below 10 H. P. the catalyst mass should be reduced; above 15 H. P. it should be increased, in proportion.

This can be done in the same model of purifier by replacing the inside perforated barrier by a shorter or longer one and altering the position of the baffle.

For much smaller or much larger engines a new container but on the same lines, would be necessary.

These data are for a thickness of catalyst mass of one and a half inches or thereabouts and an entering cross-sectional area of about 22 square inches (12½ H. P. engine).

I have found from very many experiments that in this way the usual content of carbon monoxide, say 2 to 5% can be reduced to zero, at all engine speeds.

In one form of my invention the purifier is provided with a short-circuiting device by which the gases, or part of them, are liberated without passing through the purifier (a) when the back pressure is too great for the speed required or (b) when the temperature of the catalyst mass in the purifier becomes too hot through some defective or abnormal working of the engine such as constant misfires in one or more of the cylinders.

General conditions favouring the maintenance of the zone of intense and persistent chemical activity are:—

(1) Preferably the catalyst is granular.
(2) It must exhibit sensitivity.
(3) And yet it must have the necessary robustness, i. e. durability to withstand the very high temperatures.
(4) It should be porous.
(5) The distribution of the gases is very important. The gases are preferably introduced centrally within the body of catalyst; they can then come in contact with increasing cross-sectional area of catalyst in its passage through the purifier.

Activated aluminous catalysts fulfil conditions 1 to 4 admirably.

(6) The catalyst should be closely packed so that the reaction zone is continuous and conserves heat. Widely spaced grids of catalyst would be unsuitable.

(7) The catalyst mass must be heat-insulated though not necessarily at every point. In the drawing it is shown heat insulated at the inlet and outlet ends (at 4 and 5) but the outside of the mass need not be insulated. The gases are introduced centrally in the form shown in the drawing and hence, at or near the centre of the mass, there is a zone of intense and persistent chemical reaction, which is guarded against radiation loss by the insulation 4 and 5 and also by the outer portions of the granular catalyst mass itself.

My arrangement conserves the maximum of heat while the reaction is starting up, since conduction through the catalyst mass is slow. But when the intense chemical reaction zone has been established, the arrangement must allow excessive heat to be removed to prevent the apparatus from melting; this removal of excess heat is effected by radiation and conduction and by the sensible heat of the gases.

I declare that what I claim is:—

1. Process of treating exhaust gases from internal combustion engines which consists in adding secondary air and burning the mixture without external heating by passing it through a refractory catalyst consisting of bauxite which exerts catalytic action but is further activated by a minor proportion of a compound of a metal selected from the group consisting of iron, manganese, copper, chromium, titanium.

2. A purifier for exhaust gases of internal combustion engines consisting of a casing having a longitudinal perforated pipe, an annular body of granular catalyst surrounding said pipe but spaced apart from the inner wall of the casing and a baffle extending across the mid-portion of the pipe and the body of catalyst, whereby the gases are caused to flow radially outwards through part of the catalyst, then longitudinally between the catalyst and casing, and then radially inwards through another part of catalyst to be discharged through the portion of the perforated pipe beyond the baffle.

JOHN HARGER.